US009755446B2

(12) United States Patent
Schreiner et al.

(10) Patent No.: US 9,755,446 B2
(45) Date of Patent: Sep. 5, 2017

(54) MOBILE CHARGING TABLE WITH HINGED TABLETOP AND SELECTIVELY ACCESSIBLE BATTERY COMPARTMENT OPENING

(71) Applicant: Palmer Hamilton, LLC, Elkhorn, WI (US)

(72) Inventors: Jeff Allen Schreiner, Elkhorn, WI (US); John Gregory Gardner, Elkhorn, WI (US); Tod Andrew Friske, Elkhorn, WI (US)

(73) Assignee: Palmer Hamilton, LLC, Elkhorn, WI (US)

( * ) Notice: Subject to any disclaimer, the term of this patent is extended or adjusted under 35 U.S.C. 154(b) by 161 days.

(21) Appl. No.: 14/283,686

(22) Filed: May 21, 2014

(65) Prior Publication Data
US 2015/0340892 A1 Nov. 26, 2015

(51) Int. Cl.
*H02J 7/00* (2006.01)
*A47B 13/00* (2006.01)
*A47B 37/00* (2006.01)
*A47B 21/06* (2006.01)

(52) U.S. Cl.
CPC .......... *H02J 7/0044* (2013.01); *A47B 13/003* (2013.01); *A47B 21/06* (2013.01); *A47B 37/00* (2013.01); *A47B 2013/006* (2013.01); *A47B 2021/066* (2013.01); *A47B 2200/0082* (2013.01)

(58) Field of Classification Search
CPC .. H02J 7/0044; A47B 2013/006; A47B 37/00; A47B 13/003
USPC ............................................ 320/137; 108/25
See application file for complete search history.

(56) References Cited

U.S. PATENT DOCUMENTS

| | | | | | |
|---|---|---|---|---|---|
| 1,605,345 | A | * | 11/1926 | Hawkins | H02J 7/0042 320/110 |
| 2,005,623 | A | * | 6/1935 | Heyer | H01M 10/46 211/134 |
| 2,535,523 | A | * | 12/1950 | Vibbert | H02J 7/0042 108/31 |

(Continued)

FOREIGN PATENT DOCUMENTS

| | | | |
|---|---|---|---|
| CN | 2592030 Y | * 12/2003 | |
| DE | 19606193 A1 | * 8/1997 | A47B 21/06 |

(Continued)

OTHER PUBLICATIONS

"NestaTM Laptop Tables," SMARTdesksTM, , published before Apr. 30, 2013 (see google search date in pdf), seen Feb. 26, 2016, www.smartdesks.com/pdf/NestaSpecs.pdf.*

*Primary Examiner* — Robert Grant
*Assistant Examiner* — John Trischler
(74) *Attorney, Agent, or Firm* — Boyle Fredrickson, S.C.

(57) ABSTRACT

A mobile charging table and a method of use are configured for ease of mobility and ease of service. The table has a tabletop, a base, a battery powered charging hub, and a battery compartment. The tabletop may be connected to the base by a hinge arrangement permitting tabletop movement between its first and second positions. Movement of the tabletop to its second position exposes an opening of the battery compartment for servicing a battery that supplies power to the charging hub. In the flipped down position, the tabletop extends substantially horizontally to overlie the opening in the battery compartment and to allow user(s) to use the tabletop as a workspace.

20 Claims, 12 Drawing Sheets

(56) References Cited

U.S. PATENT DOCUMENTS

| | | | | |
|---|---|---|---|---|
| 3,315,621 A * | 4/1967 | Szymber | A47B 3/10 | 108/132 |
| 3,687,089 A * | 8/1972 | Hasbrouck | A47B 27/00 | 108/136 |
| 3,694,729 A * | 9/1972 | Jones | H02J 7/0024 | 180/68.5 |
| 3,828,695 A * | 8/1974 | Skarky | A47B 13/08 | 108/26 |
| 3,999,110 A * | 12/1976 | Ramstrom | B23B 45/02 | 292/254 |
| 4,227,140 A * | 10/1980 | Nardella | H01M 10/46 | 320/113 |
| 4,237,796 A * | 12/1980 | Gordon | A61B 3/18 | 108/103 |
| 4,759,560 A * | 7/1988 | Virgulti | B25H 3/00 | 180/53.8 |
| 4,836,114 A * | 6/1989 | Cohen | A47B 37/00 | 108/60 |
| 4,896,373 A * | 1/1990 | Blake | A47B 83/04 | 446/7 |
| 5,116,098 A * | 5/1992 | Wooten | A47B 83/02 | 297/135 |
| D328,277 S * | 7/1992 | Leman | D13/108 | |
| 5,254,007 A * | 10/1993 | Eagan | A47D 1/008 | 108/43 |
| 5,667,908 A * | 9/1997 | Stone | H01M 2/1077 | 108/150 |
| 5,696,574 A * | 12/1997 | Schwaegerle | A61B 3/18 | 108/139 |
| 5,769,514 A * | 6/1998 | Brown | A47B 3/08 | 108/129 |
| 6,109,188 A * | 8/2000 | Russell | B60N 3/002 | 108/44 |
| 6,216,606 B1 * | 4/2001 | Kathardekar | A47B 21/06 | 108/50.02 |
| 6,234,812 B1 * | 5/2001 | Ivers | A47B 21/06 | 362/127 |
| 6,240,855 B1 * | 6/2001 | Pirkl | A47F 3/001 | 108/115 |
| 6,269,948 B1 * | 8/2001 | Jackson | A45C 7/0095 | 108/43 |
| 6,443,543 B1 * | 9/2002 | Chiang | A47B 21/00 | 180/65.1 |
| 6,493,217 B1 * | 12/2002 | Jenkins, Jr. | A47B 21/00 | 108/147 |
| 6,588,346 B1 * | 7/2003 | Bockheim | A47B 17/065 | 108/50.02 |
| 6,617,972 B2 * | 9/2003 | Takarada | G08B 21/0484 | 324/538 |
| 7,032,522 B2 * | 4/2006 | George | A47B 9/20 | 108/49 |
| 7,130,190 B1 | 10/2006 | Baker | | |
| 7,198,511 B2 | 4/2007 | Brennan, Jr. | | |
| 7,314,010 B2 * | 1/2008 | George | A47B 9/20 | 108/49 |
| 7,445,300 B2 * | 11/2008 | Collins | A47B 97/00 | 312/249.8 |
| 7,540,243 B2 * | 6/2009 | George | A47B 9/20 | 108/49 |
| 7,549,381 B1 * | 6/2009 | Nail, Jr. | A47B 3/0912 | 108/132 |
| 7,565,968 B2 * | 7/2009 | Lindley | A62B 99/00 | 206/223 |
| 7,594,668 B2 * | 9/2009 | Arceta | A61G 12/001 | 108/147.19 |
| 7,614,600 B1 * | 11/2009 | Smith | G09F 23/00 | 135/16 |
| 7,626,119 B2 * | 12/2009 | Axland | H01R 25/006 | 174/135 |
| 7,626,120 B1 * | 12/2009 | Golden | H02G 3/185 | 174/135 |
| 7,674,119 B1 | 3/2010 | McCarthy | | |
| 7,750,599 B2 * | 7/2010 | Kaji | H02J 7/0042 | 320/107 |
| 7,859,836 B2 * | 12/2010 | Bae | A47B 21/00 | 108/50.02 |
| 7,915,856 B2 * | 3/2011 | Krampitz | G01R 31/3627 | 320/103 |
| 7,975,624 B2 * | 7/2011 | Henriott | A47B 21/00 | 108/50.02 |
| 7,997,212 B2 * | 8/2011 | Henriott | A47B 21/00 | 108/50.02 |
| 8,061,864 B2 * | 11/2011 | Metcalf | A47B 21/00 | 307/150 |
| 8,082,856 B1 * | 12/2011 | Hayden | A47B 21/06 | 108/25 |
| 8,082,857 B2 * | 12/2011 | George | A61B 5/0002 | 108/49 |
| 8,084,992 B2 * | 12/2011 | Scheffy | B25H 3/02 | 312/223.1 |
| 8,104,491 B2 * | 1/2012 | Li | A45B 23/00 | 135/16 |
| 8,245,652 B2 * | 8/2012 | Hung | A61G 12/001 | 108/147 |
| 8,262,244 B2 | 9/2012 | Metcalf et al. | | |
| 8,421,407 B2 * | 4/2013 | Johnson | H02J 5/005 | 108/65 |
| 8,497,656 B2 * | 7/2013 | Portis, Jr. | A45B 3/00 | 136/243 |
| 8,677,911 B2 * | 3/2014 | McRorie | G06F 1/1628 | 108/50.02 |
| 8,771,008 B1 * | 7/2014 | Black | H01R 24/76 | 439/535 |
| 8,951,054 B2 * | 2/2015 | Byrne | H01R 13/447 | 307/104 |
| 9,088,181 B2 * | 7/2015 | Akin | H02J 7/35 | |
| 9,209,650 B2 * | 12/2015 | Nita | H02J 7/355 | |
| 2002/0158763 A1 | 10/2002 | Takarada | G08B 21/0484 | 340/573.1 |
| 2003/0112147 A1 * | 6/2003 | George | A47B 9/20 | 340/691.6 |
| 2003/0128507 A1 * | 7/2003 | Metcalf | G06F 1/1613 | 361/679.21 |
| 2004/0026998 A1 * | 2/2004 | Henriott | A47B 21/06 | 307/9.1 |
| 2005/0280979 A1 * | 12/2005 | Wu | H01M 2/1016 | 361/625 |
| 2006/0028177 A1 * | 2/2006 | Ferro | B62B 1/125 | 320/114 |
| 2006/0075934 A1 * | 4/2006 | Ram | B60N 3/004 | 108/44 |
| 2006/0180054 A1 * | 8/2006 | George | A47B 9/20 | 108/50.11 |
| 2007/0029746 A1 * | 2/2007 | Brennan | B25H 3/00 | 280/47.26 |
| 2007/0157856 A1 * | 7/2007 | Skoog | A47B 81/061 | 108/70 |
| 2007/0159781 A1 * | 7/2007 | Zbikowski | A45C 13/02 | 361/679.27 |
| 2007/0227409 A1 * | 10/2007 | Chu | A47B 21/00 | 108/50.02 |
| 2007/0283987 A1 * | 12/2007 | Reyes | A45B 3/04 | 135/16 |
| 2008/0087202 A1 * | 4/2008 | George | A47B 9/20 | 108/50.01 |
| 2008/0231228 A1 * | 9/2008 | Fowler | B62B 3/1424 | 320/107 |
| 2008/0295742 A1 * | 12/2008 | Henriott | A47B 21/00 | 108/6 |
| 2008/0295744 A1 * | 12/2008 | Henriott | A47B 21/00 | 108/50.02 |
| 2009/0000522 A1 * | 1/2009 | Collins | B25H 1/04 | 108/12 |
| 2009/0058354 A1 | 3/2009 | Harrison | | |
| 2009/0072782 A1 * | 3/2009 | Randall | G06F 1/1616 | 320/107 |
| 2009/0154079 A1 * | 6/2009 | Bae | A47B 21/00 | 361/679.02 |

(56) References Cited

U.S. PATENT DOCUMENTS

| | | | | |
|---|---|---|---|---|
| 2009/0241807 A1* | 10/2009 | George | A61B 5/0002 | 108/50.02 |
| 2009/0266274 A1* | 10/2009 | Berlin | A47B 23/046 | 108/6 |
| 2009/0272299 A1* | 11/2009 | Rios | A47B 3/083 | 108/36 |
| 2009/0276319 A1* | 11/2009 | Lungu | G06Q 30/02 | 705/14.73 |
| 2009/0284222 A1* | 11/2009 | Tamura | G06F 1/263 | 320/112 |
| 2009/0293774 A1* | 12/2009 | Cheung | A47B 5/06 | 108/44 |
| 2010/0064945 A1* | 3/2010 | Sierenberg | A47B 37/04 | 108/50.02 |
| 2010/0201201 A1* | 8/2010 | Mobarhan | H02J 5/005 | 307/104 |
| 2010/0277121 A1* | 11/2010 | Hall | B60L 11/182 | 320/108 |
| 2010/0326849 A1* | 12/2010 | Trimarche | A45B 3/04 | 206/223 |
| 2011/0041739 A1* | 2/2011 | Verweij | A47B 9/04 | 108/147.19 |
| 2011/0126739 A1* | 6/2011 | Korpi | A47B 23/044 | 108/6 |
| 2011/0193524 A1* | 8/2011 | Hazzard | G06F 1/1632 | 320/114 |
| 2011/0197794 A1 | 8/2011 | Nunes | | |
| 2011/0232535 A1* | 9/2011 | Hung | A61G 12/001 | 108/25 |
| 2011/0265694 A1* | 11/2011 | Portis | A45B 3/00 | 108/50.12 |
| 2012/0026724 A1 | 2/2012 | Metcalf et al. | | |
| 2012/0236496 A1* | 9/2012 | McRorie | G06F 1/1628 | 361/679.55 |
| 2012/0312196 A1* | 12/2012 | Newkirk | H02J 7/025 | 108/23 |
| 2012/0312199 A1* | 12/2012 | Johnson | A47B 21/0073 | 108/50.11 |
| 2012/0318179 A1* | 12/2012 | Noeth | A47B 37/00 | 108/50.13 |
| 2013/0175993 A1* | 7/2013 | Chen | H02J 7/0027 | 320/114 |
| 2013/0199419 A1* | 8/2013 | Hjelm | A47B 9/00 | 108/20 |
| 2013/0234645 A1* | 9/2013 | Goei | H02J 7/0052 | 320/101 |
| 2013/0239855 A1* | 9/2013 | Miller | A47B 21/00 | 108/28 |
| 2013/0241468 A1* | 9/2013 | Moshfeghi | H02J 7/025 | 320/107 |
| 2014/0009103 A1* | 1/2014 | Nita | H02J 7/355 | 320/101 |
| 2014/0054961 A1* | 2/2014 | Metcalf | H02J 17/00 | 307/19 |
| 2014/0096706 A1* | 4/2014 | Labrosse | A47B 21/02 | 108/21 |
| 2014/0152099 A1* | 6/2014 | Boyd | H02J 7/0052 | 307/23 |
| 2014/0217954 A1* | 8/2014 | Wilde | A47B 37/04 | 320/101 |
| 2014/0312852 A1* | 10/2014 | Won | H02J 7/025 | 320/137 |
| 2014/0373758 A1* | 12/2014 | Pajic | A47C 7/70 | 108/3 |
| 2015/0096473 A1* | 4/2015 | Leukel | A47B 21/06 | 108/50.02 |
| 2016/0022032 A1* | 1/2016 | Simon | A45C 13/28 | 108/42 |

FOREIGN PATENT DOCUMENTS

| | | | | |
|---|---|---|---|---|
| DE | 202005016133 U1 * | 12/2005 | | F21S 9/02 |
| DE | 202013104532 U1 * | 10/2013 | | A47B 9/02 |
| DE | 102013017696 A1 * | 7/2014 | | B60N 3/004 |
| JP | 11108370 A * | 4/1999 | | |
| JP | 2001186935 A * | 7/2001 | | |
| JP | 2002085164 A * | 3/2002 | | |
| WO | WO 9749161 A2 * | 12/1997 | | G06F 1/16 |

* cited by examiner

MOBILE CHARGING TABLE WITH HINGED TABLETOP AND SELECTIVELY ACCESSIBLE BATTERY COMPARTMENT OPENING

BACKGROUND OF THE INVENTION

1. Field of the Invention

The invention relates generally to recharging stations for portable electronic devices, and more particularly, relates to a battery-powered mobile recharging table. The invention additionally relates to a method of using such a charging table.

2. Discussion of the Related Art

In today's technological world, there is an ever-increasing use of and reliance on portable electronic devices, such as cell phones, tablets, and laptops. These portable devices normally include internal rechargeable batteries which may be recharged by connecting the devices to a power source. The result of this ever-increasing use of portable electronic devices is an increasing need for quick charge power sources, especially in public places when the user is away from their home.

Many older and some newer facilities are not equipped to handle this growing need for charging stations. For instance, older schools, conference centers, and airports are ill-equipped to supply quick-charge power sources to the large number of potential users that demand them. These facilities do not have a large number of electrical outlets and/or the outlets are located in inconvenient locations. Therefore, many facilities are relying upon charging stations which will provide users a greater number of outlets, e.g., 110V, 120V outlets and USB ports, for each standard outlet to which it is connected.

The typical charging station normally requires at least one dedicated wired connection to a power source, such as a standard outlet. While such a charging station provides a continuous and theoretically unlimited supply of power, it typically is erected permanently or semi-permanently at a dedicated location that might be inconvenient to many users. Such dedicated charging stations also reduce the range of applications of multi-purpose facilities. Even mobile recharging stations that are supported on casters or wheels must remain connected to an electrical outlet; therefore, their mobility is dependent on the length of the power cord. Greater mobility may be desired where an electrical outlet is not readily available or is far away from the desired location of the charging station. Moreover, the cord is often bothersome. Another disadvantage of typical charging stations is that they often provide limited counter space that usually is not large enough to support a laptop. They are generally not built as a workspace, but rather as a quick-charge station for quick charge and go. However, when recharging takes time, the user may desire to use the mobile device while it is recharging.

In light of the foregoing, a mobile charging table which is easy to maneuver and is not restrained by an electrical power cord is desired.

A method of recharging portable electronic devices on a mobile table often is desired.

SUMMARY OF THE INVENTION

One or more of the above-identified needs are met by providing a mobile charging table having a tabletop, a base, a battery powered charging hub, and a battery compartment. The tabletop may be connected to the base by a hinge arrangement or other structure permitting tabletop movement between its first and second positions. Movement of the tabletop to its second position exposes an opening of the battery compartment for servicing a battery that supplies power to the charging hub. In the deployed or operative, the tabletop extends substantially horizontally to overlie the opening in the battery compartment and to allow user(s) to use the tabletop as a workspace. The table may be placed in a public meeting place, such as a school, conference center, or airport, without the disadvantages of poor mobility and power cord hindrance.

In accordance with a first aspect of the invention, a charging table is provided having a base and a tabletop supported by the base. The tabletop has a first surface and a second surface. A battery powered charging hub is supported on the first surface of the tabletop and has at least one port for connection to a portable electronic device. A battery compartment is supported on the base and defined by an enclosure having an upper access opening for inserting and removing at least one battery. The tabletop is coupled to the base so as to be selectively movable 1) from a first position in which the first surface extends at least substantially horizontally and the second surface overlies the battery compartment 2) to a second position in which the access opening is exposed to permit battery insertion into and removal from the battery compartment.

In one embodiment, a hinge arrangement coupling the tabletop to the base permits pivoting movement of the tabletop between the first and second positions. The first surface extends at an angle relative to the horizontal when the tabletop is in the second position thereof.

In one embodiment, the first surface swings through a vertical plane when the tabletop moves from the first position thereof to the second position thereof.

In one embodiment, the enclosure has a body that is mounted on the base and a lid that is pivotally connected to the body so as to selectively overlay the opening, the lid being attached to the second surface of the tabletop.

In accordance with another aspect of the invention, a charging table system may have a mobile base supported on wheels and a tabletop having a first surface and a second surface. The system also has a battery compartment defined by an enclosure that is mounted on top of the base. The battery compartment has a body defining an interior and an upper opening for removably receiving at least one battery and a lid pivotally connected to the body so as to pivot about a horizontal axis, the lid being attached to the second surface of the tabletop so as to allow the tabletop to move from a first position in which the tabletop overlies the upper opening of the enclosure to a second position in which the tabletop extends at an angle substantially perpendicular to the opening. The system also has a battery powered charging hub disposed on the first surface and having at least one port for connection to a portable electronic device and an electrical connection extending from the charging hub, through the tabletop, and into the battery compartment.

In accordance with yet another aspect of the invention, a method of charging a portable electronic device on a table assembly is provided including the steps of positioning a charging table in a desired location, moving the tabletop from a first position in which the first surface extends at least substantially horizontally and the second surface overlies a battery compartment to a second position in which an access opening in the battery compartment is exposed. Additional steps include removing a first battery from the battery compartment via the access opening, replacing the first battery with a second battery, and returning the tabletop to the first position.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of tables could be constructed in accordance with the invention as defined by the claims. Hence, while the preferred embodiments of the invention will now be described with reference to a portable battery charging table, it should be understood that the invention is in no way so limited.

Figure 1:
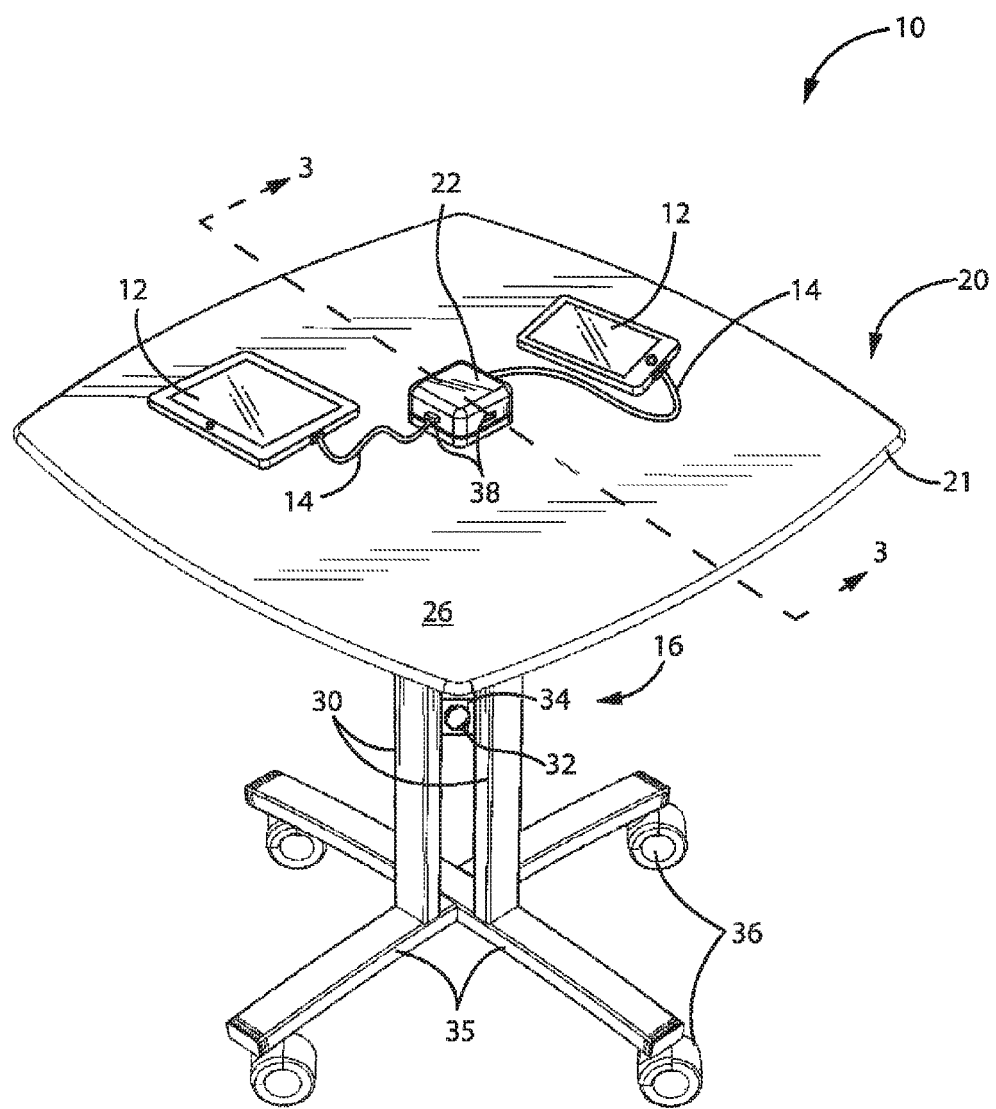
FIG. 1 is an isometric view of a recharging table of a first embodiment of the present invention, showing the tabletop in a deployed or flipped down position and with a number of portable electronic devices, such as a cell phone and a tablet, being used in connection with the recharging table.

FIG. 1 is an isometric view of a portable charging table 10 used to charge portable electronic devices 12, such as laptops, cell phones and tablets in accordance with one embodiment of the invention. FIG. 1 shows the charging table 10 used in connection with a tablet, such as an iPad®, and a cell phone, such as an iPhone®. Each electronic device 12 is connected to the charging table 10 via a charging cable 14, such as a USB charging cable.

Figure 2:
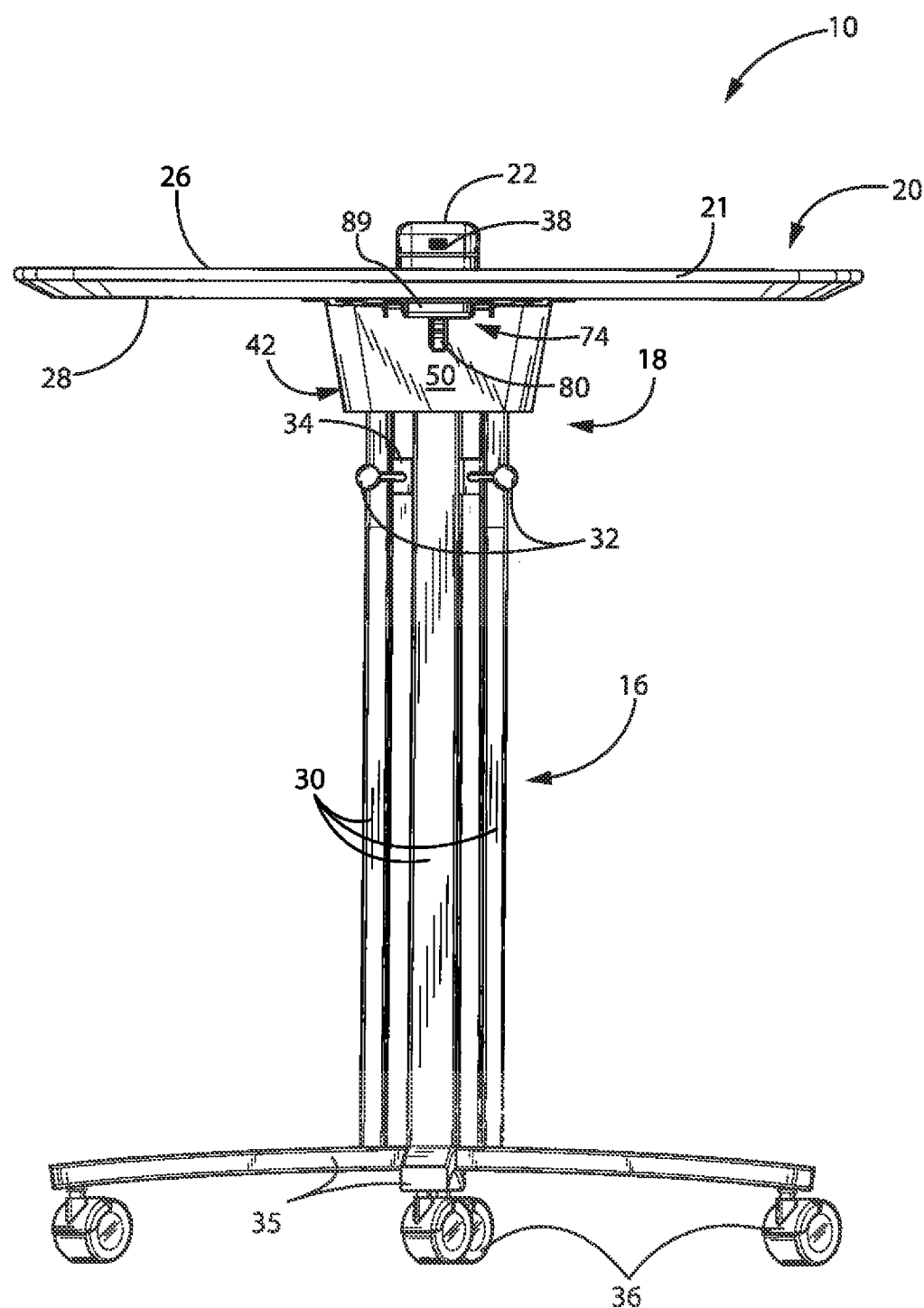
FIG. 2 is a front elevation view of the recharging table of FIG. 1.
Figure 3:
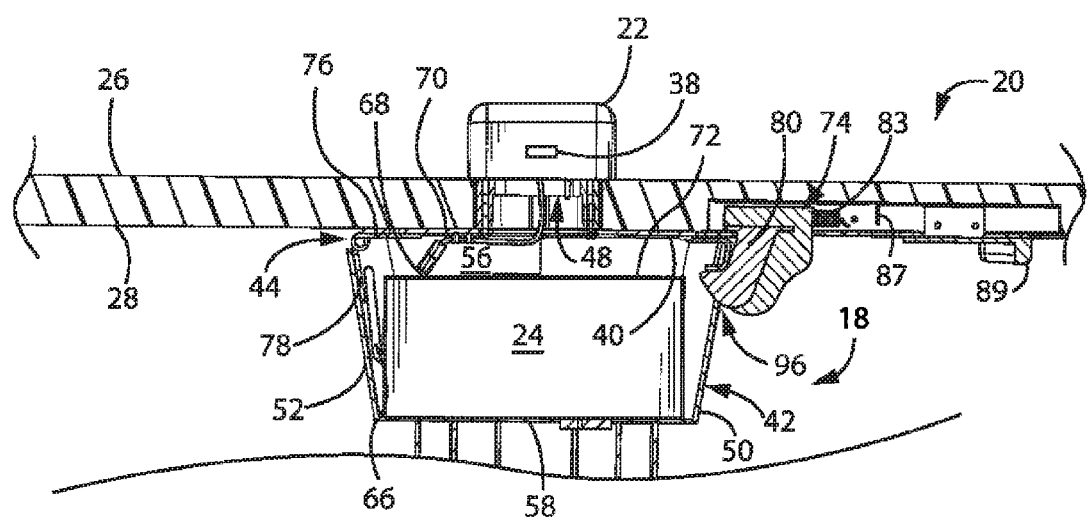
FIG. 3 is a cross-sectional left elevation view taken generally along the line 3-3 in FIG. 1 and illustrating the hinge and a latch assembly in greater detail and with a latch in its engaged position.
Figure 4:
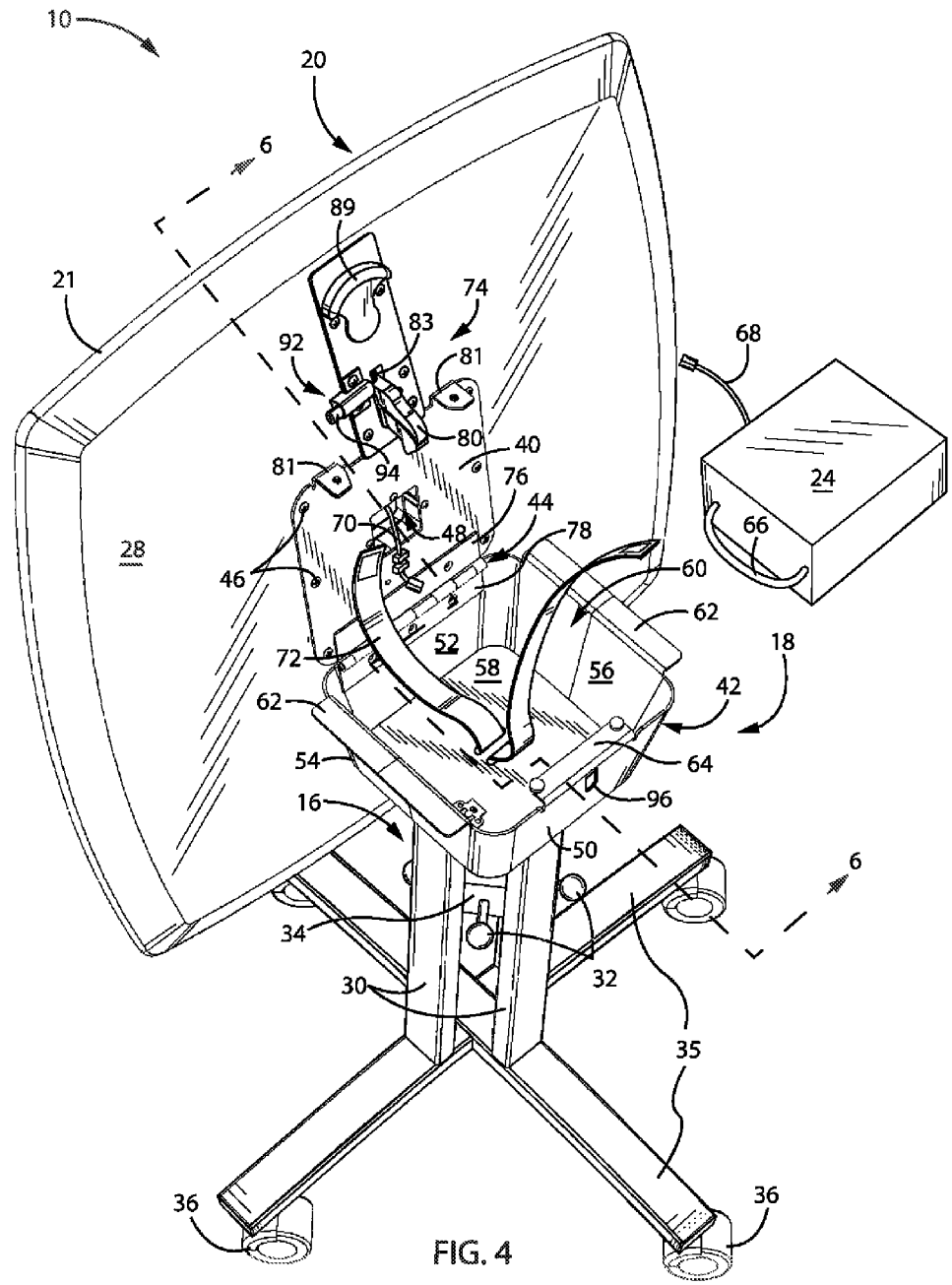
FIG. 4 is an isometric view of the recharging table, viewed from a location above and generally in front of the table and showing the tabletop in a flipped up or retracted position and exposing a battery compartment with the battery removed.
Figure 5:
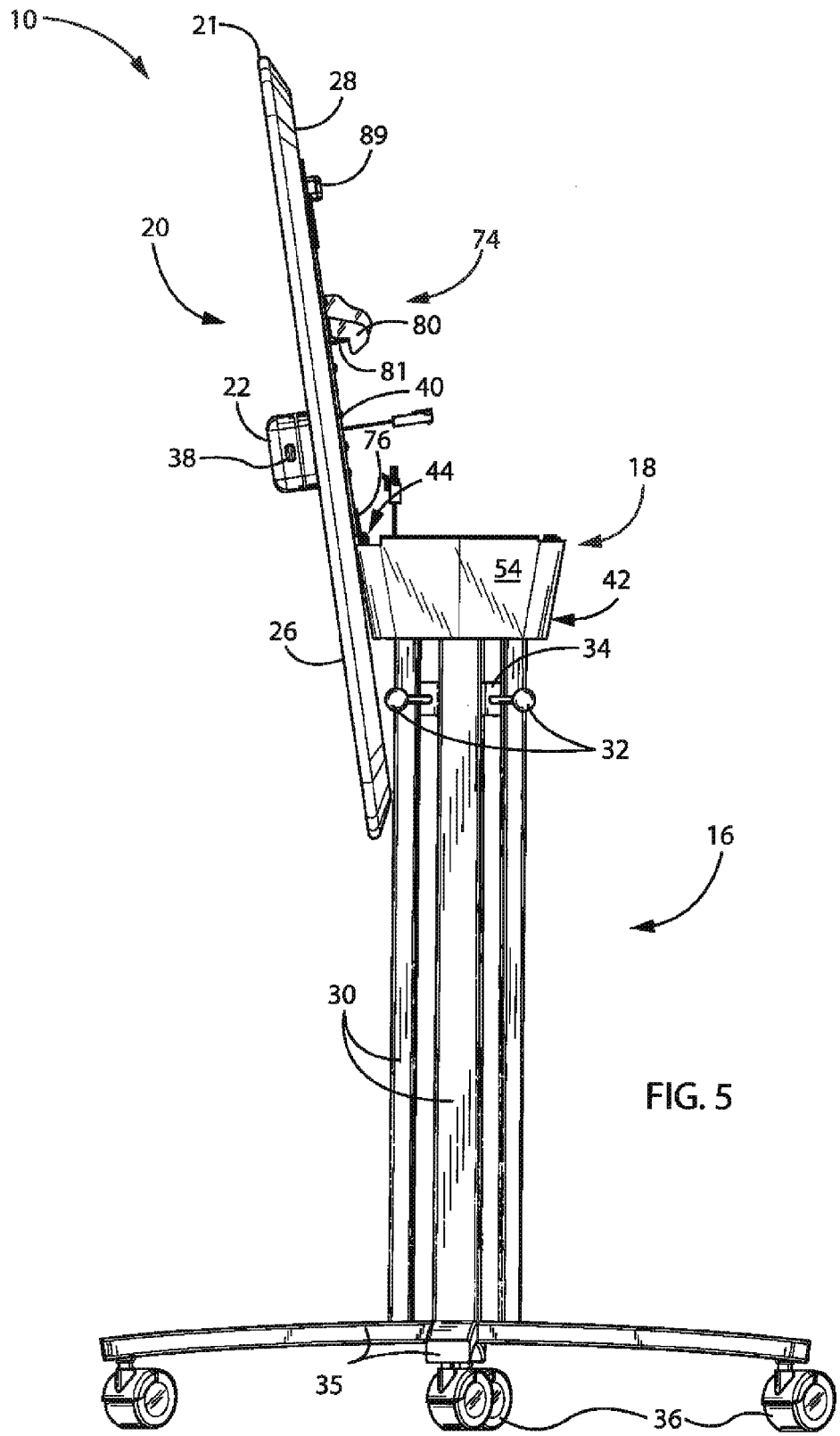
FIG. 5 is a left side elevation view corresponding to FIG. 4, showing the tabletop in the flipped up position.
Figure 6:
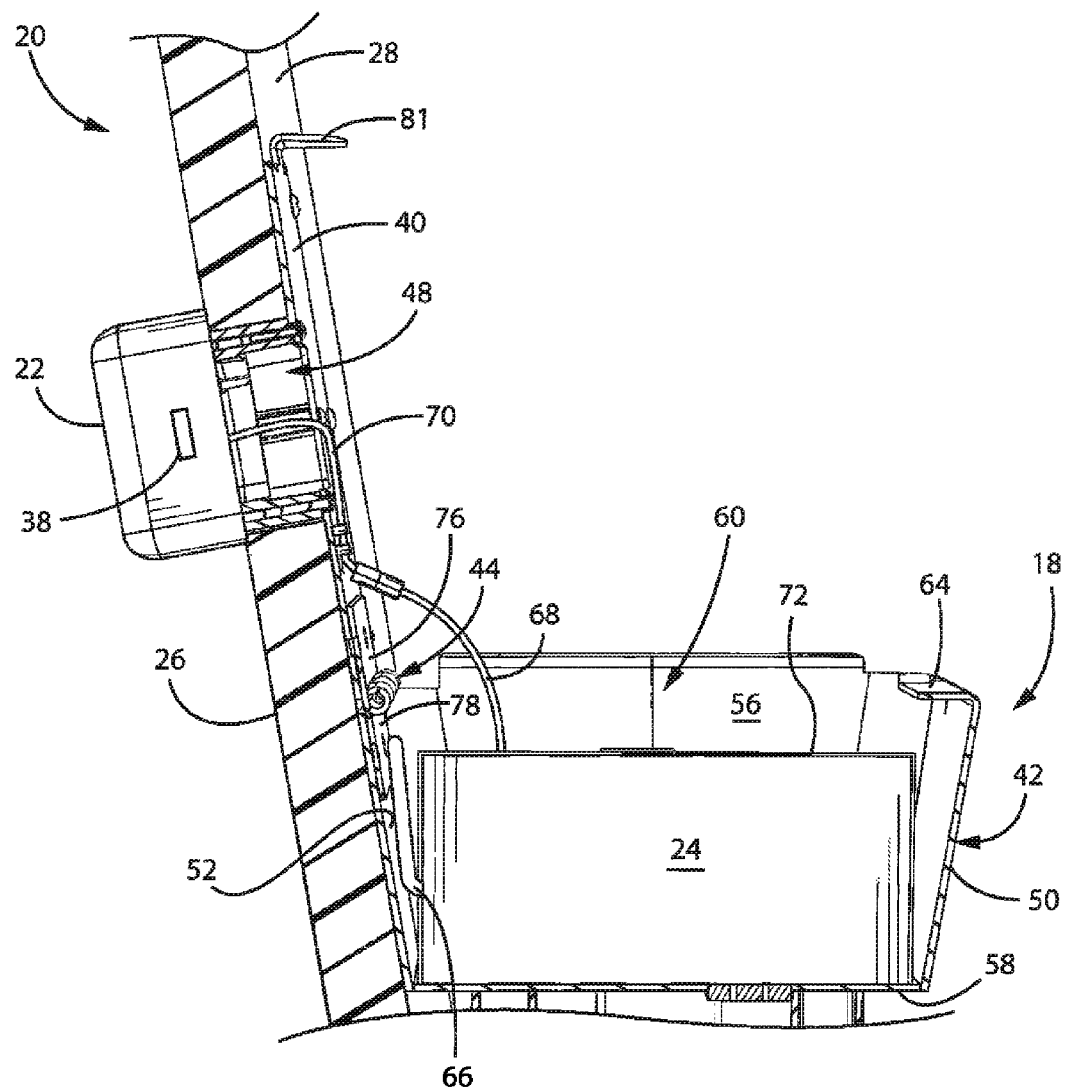
FIG. 6 is a cross-sectional left elevation view taken generally along the line 6-6 in FIG. 3, and showing the tabletop in the flipped up position and the latch in its disengaged position.

Referring now to FIGS. 1 through 3, the portable charging table 10 discloses a base 16; a battery compartment 18 located on top of the base 16, and a tabletop 20 mounted on top of the battery compartment 18 and supporting a battery-powered charging hub 22. The tabletop 20 is movably mounted on the base 16, possibly by being mounted directly or indirectly on the battery compartment 18, so as to be movable from a first, operative or deployed position in which first and second major surfaces of the tabletop 20 extend horizontally as shown in FIGS. 1 and 2 to a second or retracted position in which an upper access opening 60 in the battery compartment 18 is exposed to permit battery insertion into and removal from the battery compartment 18. In the illustrated embodiment, the tabletop 20 pivots to this second position, as seen in FIGS. 4-6. In one embodiment, the tabletop 20 is mounted to the battery compartment 18, e.g., at a hinged joint. The battery compartment 18, in turn, is welded to the base 16 so as to couple the tabletop 20 to the base 16.

Referring again to FIGS. 1 and 2, when the tabletop 20 is in the first position, a first surface 26 of the tabletop 20 extends horizontally to provide a substantially flat surface for resting the electronic devices 12 thereon. This first surface 26 preferably has a surface area at least four times the surface area of each of the electronic devices 12 being charged. In this respect, the tabletop 20 provides a work surface that two or more users can use while waiting for their device to be charged. The tabletop 20 also has a second surface 28 of the tabletop 20 faces downwardly toward the ground. While the tabletop 20 is shown having a square surface, the tabletop 20 may be circular, rectangular, or take any other shape, as desired.

In one embodiment of the invention, the tabletop 20 is made of a substrate laminated material, such as high density particle board covered with high pressure laminate for strength and durability. Tabletop 20 may further include a reinforced edge 21, such as polyurea coating, urethane edging, or aluminum edging, for additional durability and comfort. The reinforced edge 21 helps to resist moisture, debris, and tampering, while also being impact and puncture resistant.

Still referring to FIGS. 1 and 2, the base 16 extends upwardly from the ground. The base 16 may have a number of vertically extending columns 30 which provide height to the tabletop 20 so that the tabletop 20 may be used when standing, or alternatively, for seated use so that chairs may fit underneath the tabletop 20. It is contemplated that the base 16 may have any number of vertically extending columns 30, legs, or other supports including one. The vertically extending columns 30 may have knobs or hooks 32 for hanging backpacks or purses underneath the tabletop 20. Alternatively, and as shown, the knobs or hooks 32 may extend outward through the space between the vertically extending columns 30, and from a common structure 34 mounted between the vertically extending columns 30.

The base 16 may be supported on the ground by a plurality of wheels 36, such as caster wheels, which allow for improved mobility of the table 10. The wheels 36 may be peripherally disposed on the prongs of a spider base defined by generally horizontally extending prongs 35. The spider base may comprise of 4-prongs (e.g., arranged in a cross formation, as shown) or as a 3-prong or 2-prong spider base, as understood in the art. Alternatively, the wheels 36 may support a round or rectangular base with the wheels 36 arranged underneath and along the perimeter of the base in a symmetric and balanced manner. In this regard, the table 10 may be easily moved to public meeting places, such as a schools, conference centers, or airports. In an alternative embodiment, the base may rest upon the ground without any wheels 36.

In one embodiment of the invention, the base 16 or a portion of the base 16 is made of commercial-grade cast iron, steel (e.g., 12 gauge steel or 14-gauge steel), stainless steel, or aluminum. If the tabletop 20 is to be used while the user is standing, the base 16 height may be approximately 40 inches, and if the tabletop 20 is to be used while the user is sitting, the base 16 height is approximately 28 inches to allow for chair(s) to fit underneath the tabletop 20.

The charging hub 22 has a plurality of ports 38, such as USB ports, easily accessible from the first surface 26 of the tabletop 20, and electrical connectors stored below the first surface 26 and hidden out of sight. The ports 38 could comprise USB ports and/or any combination of specialized ports configured for coupling to then-popular portable electronic devices 12. It is contemplated that different ports 38 may be available on the charging hub 22, such as standard 110 or 120 volt outlets or other desirable charging outlets.

FIGS. 2 and 3 are side elevation views of the charging table assembly 10 showing the tabletop 20 in the first position with the tabletop 20 in a flipped down, operative position. In this position, the tabletop 20 is extending in a generally horizontal direction and the battery compartment opening 60 is covered by a battery compartment lid 40. The battery compartment 18 is supported on the base 16 with the vertically extending columns 30 extending downwardly from the battery compartment 18.

Figure 7:
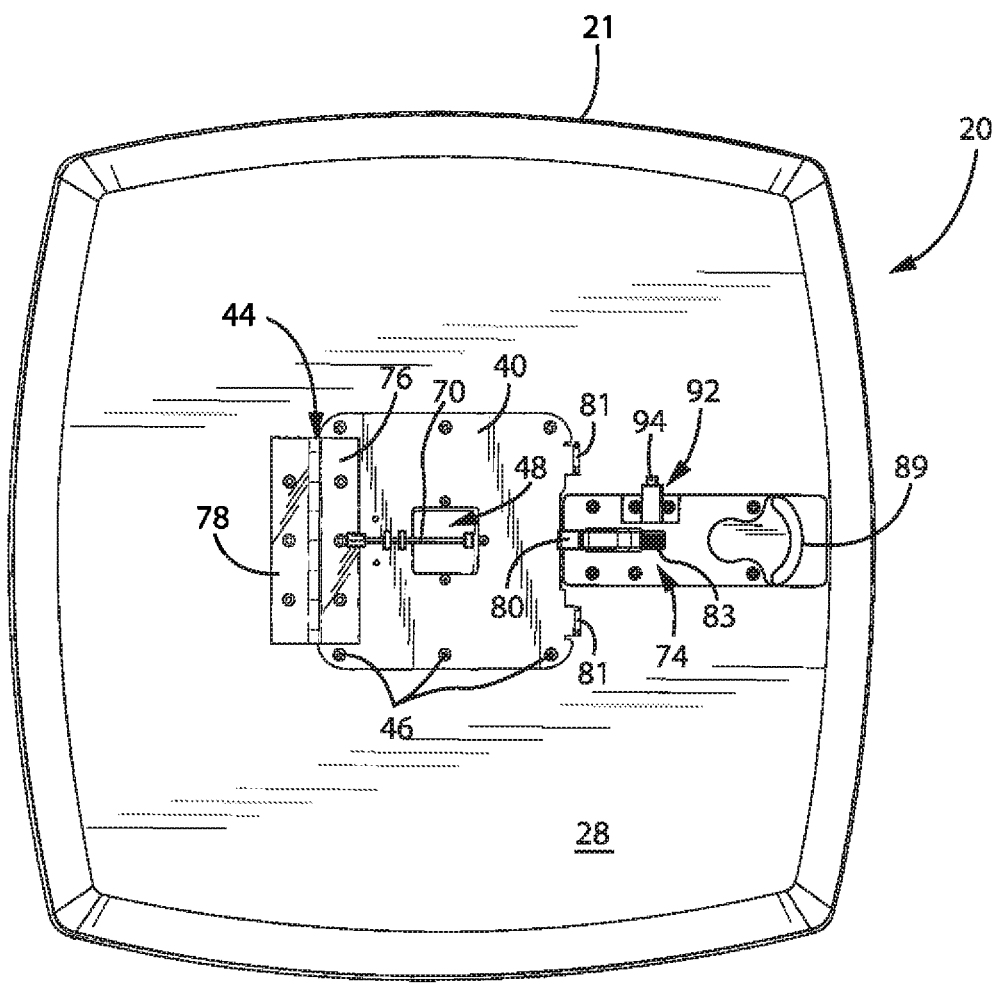
FIG. 7 is a bottom plan view of the tabletop showing the battery compartment lid and hinge assembly disconnected from a body of the battery compartment.

The battery compartment 18 is mounted on an upper end of the base 16 and supports the tabletop 20. The battery compartment 18 comprises a body 42 and a lid 40 coupled to the body 42 by a hinge assembly 44. The lid 40 is affixed to or recessed in the second surface 28 of the tabletop 20 to, in effect, pivotally connect the tabletop 20 to the base 16. In one embodiment, as seen in FIG. 7, the lid 40 is fixedly secured to the second surface 28 of the tabletop 20 such that movement of the lid 40 correspondingly moves the tabletop 20 position as well, and vice versa. The lid 40 may be secured by a number of screws 46 positioned around the perimeter of the lid 40. The lid 40 may be secured at the center of the second surface 28 so that the tabletop 20 is centered on the base 16 at its center of gravity. As previously mentioned, an opening 48 may be found in the lid 40 and the tabletop 20 which allows one or more electrical cables 70 to extend from the battery compartment 18, through the tabletop 20, and to the charging hub 22.

The body 42 has front 50, back 52, left 54 and right 56 sidewalls enclosed at a lower edge by a bottom wall 58 defining the battery compartment floor. The top edges of the front 50, back 52, left 54 and right 56 sidewalls define the compartment opening 60. The battery compartment 18 is shown with a generally rectangular construction; however, it is contemplated that the battery compartment 18 may be any number of shapes and sizes, depending on the size and shape of the battery 24 or batteries to be housed therein. As shown, the battery compartment 18 is slightly tapered from its upper end to its lower end so as to provide a greater surface area at the compartment opening 60 compared to a smaller surface area at the compartment floor 58. The compartment opening 60 has a surface area smaller than the surface area of the second surface 28 of the tabletop 20 so that the tabletop 20 overlaps and overhangs past the compartment opening 60. As seen in FIG. 4, outwardly extending flanges 62 may extend from the top edges of the left 54 and right 56 sidewalls of the compartment 18 to receive the second surface 28 of the tabletop 20. An inwardly extending flange 64 may extend from the top edge of the front sidewall 50 of the compartment 18 to receive the compartment lid 40. Two tangs 81 may extend downwardly from the lid 40 so that the tangs 81 lie adjacent to an inner surface of the front sidewall 50 of the compartment 18 when the tabletop is in a closed position.

Referring to FIGS. 3 and 6, the interior of the battery compartment 18 may house a battery 24 which supplies power to the charging hub 22. It is contemplated that the battery 24 is a "heavy duty" rechargeable battery with a high battery capacity. The battery 24 may weigh as much as 12 lbs. or more. The battery 24 may have a carrying handle 66 to facilitate removal and installation of the battery 24 into and out of the battery compartment 18, and also transport of the battery 24 to, e.g., a battery charging cart or storage area.

As understood in the art, the battery 24 may include an electrical connector 68 for delivering electrical current to the desired destination. In one embodiment, the electrical connector 68 of the battery 24 may couple with the charging hub 22 via a cord or cable 70. The cable or cord 70 may extend through the opening 48 of the tabletop 20 and the compartment lid 40.

As seen in FIG. 4, a strap 72, coupled to the compartment floor 58, may wrap around the battery 24 to securely fasten the battery 24 within the compartment 18 and prevent shifting of the battery 24 during table 10 movement. The strap 72 may be tightened and secured around the battery 24 by hook and loop fasteners, e.g., Velcro, or any other suitable fastening device, such as buckles or elastic straps. The contents of the compartment 18 may be easily exposed to by opening and closing of the compartment lid 40. The compartment lid 40 is sized substantially commensurate with the compartment opening 60 to cover the battery compartment opening 60.

Referring to FIGS. 4-7, the hinge 44 allows the lid 40 of the battery compartment 18 to pivot about a horizontal axis from a first closed position to a second open position. The hinge assembly 44 couples the lid 40 to the battery compartment 18 at the back sidewall 52 of the battery compartment 18. A first hinge portion 76 is secured to the lid 40, and a second hinge portion 78 is secured to an upper inner surface of the back sidewall 52. The horizontal axis of rotation is therefore positioned between the lid 40 and the battery compartment 18 to allow movement of the lid 40 with respect to the battery compartment 18. Preferably, the battery compartment 18, base 16, and tabletop 20 are dimensioned relative to one another so that the tabletop 20 swings through an over-center position (i.e., through a vertical plane) when being flipped up so that the tabletop 20 will reliably remain in its inoperative position, even if the table 10 is moved, until it is flipped back to its first, deployed position. An angle of between 0-20° past vertical to the over-center position is contemplated. In an alternative embodiment of the present invention (not shown) tabletop 20 only partially extends open, such as between 45-90° from horizontal, when the tabletop is in its second position.

Referring to FIGS. 2 and 3, in the first closed position, the lid 40 extends parallel with the opening 60 of the compartment 18 to substantially enclose the battery compartment 18. Simultaneously, the tabletop 20 extends horizontally with respect to the ground and is in its deployed position. In the first, closed position, the lid 40 of the battery compartment 18 is secured to the compartment 18 by a latch assembly 74, as seen in FIG. 4.

Figure 8A:
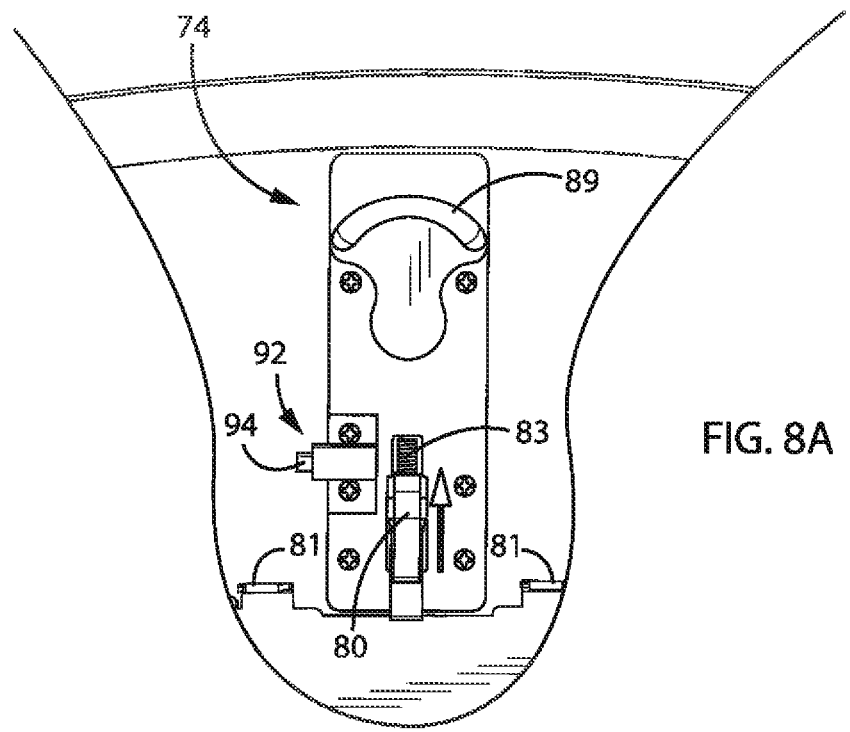
FIG. 8A is an enlarged view of a portion of the tabletop, showing a bolt showing a lock of the assembly unlocked and showing a bolt in a retracted position.
Figure 8B:
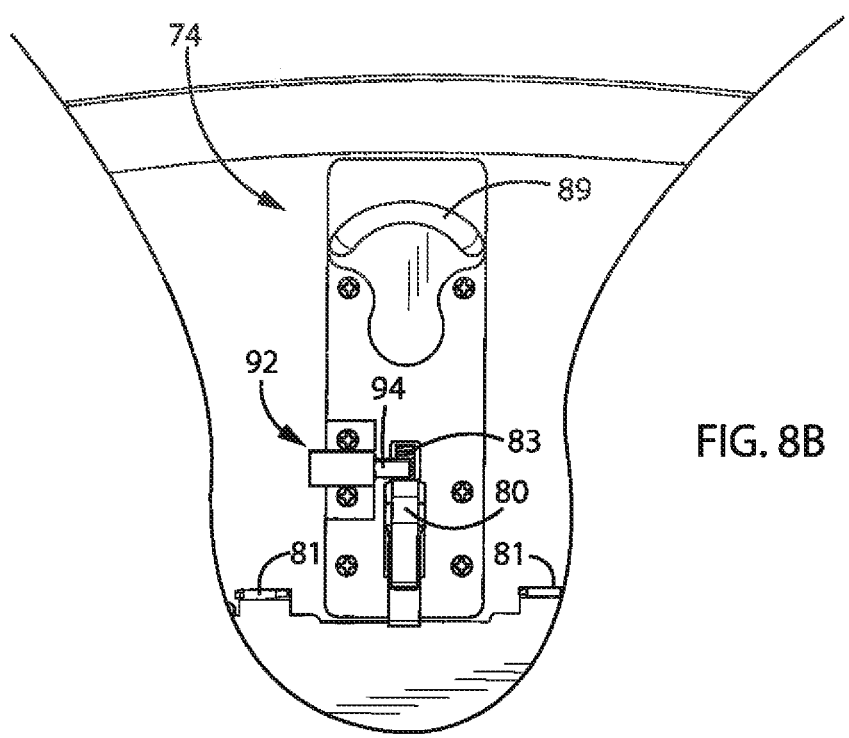
FIG. 8B is an enlarged view of the portion of the tabletop shown in FIG. 8A, showing the lock and bolt engaged.

As seen in FIGS. 3, 4, 8A and 8B, the latch assembly 74 may include a latch 80 that, in the flipped down position of the tabletop 20, extends downwardly from the second surface 28 of the tabletop 20 into engagement with an opening 96 in the front side wall 50 of the compartment 18. The latch 80 is movable by an arm 87 that is recessed within the tabletop 20 from the engaged position of FIGS. 3 and 8a to the disengaged position of FIG. 8B. The latch 80 may extend outwardly from the lid 40 or second surface 28 and is biased inwardly toward a center of the tabletop 20 by a spring 83. In order to retract the latch 80 into from opening 96, a handle 89 of the arm 87 is moved outward relative to the center of the tabletop 20 and against the inward resistance of spring 83, displacing the arm 87 and correspondingly displacing the latch 80 outside of the opening 96 of the front sidewall 50 as seen in FIG. 8A. When the arm 87 is released, the spring causes the latch 80 to engage the opening 96 of the front sidewall 50 of the compartment 18 from the compartment's outer surface when the tabletop 20 is in the closed position as seen in FIG. 8B.

As seen in FIG. 8B, in order to secure the latch 80 in its engaged position, movement of the arm 87 is prevented by the extension of a bolt 94 of a lock 92 into the displacement path of the latch 80 under operation of a key or combination (not shown). As seen in FIG. 8A, when the lock 92 is in unlocked, the bolt 94 retracts so as to clear the displacement path of the latch 80 and allow full outward movement of the latch 80 to its disengaged position of FIG. 8A. This lock feature prevents unwanted tampering with movement of the tabletop 20 and unwanted access of the battery compartment 18 and its contents. It is contemplated that the latch assembly 74 may include one or more additional downwardly extending latches 80 corresponding to one or more openings 96 of the front sidewall 50.

Referring to FIGS. 4-6, in the second or open position, the lid 40 of the battery compartment 18 extends at an angle substantially perpendicular to the opening 60 of the compartment 18 so as to allow full access to the interior of the compartment 18 via the opening 60. Simultaneously, the tabletop 20 extends substantially perpendicular to the ground.

In use, the charging table 10 is transported to a desired location by pushing it on its wheels 36. The charging table assembly 10 is easy to store and transport when the tabletop 20 is in the second, flipped up position because the tabletop 20 extends generally vertically and does not take as much breadth as it does when it is in its flipped down position However, it is understood that the table assembly 10 may be transported with the tabletop 20 in either the flipped down or flipped up positions.

Once in the desired location, the tabletop 20 is moved, or maintained at, the first, flipped down position. As seen by the resulting operative position in FIGS. 1-3, the tabletop 20 is extended horizontally so that portable electronic devices 12 may rest upon the first surface 26 of the tabletop 20 during charging. Each user may connect his or her portable electronic device 12 to the charging hub 22 located on the first surface 26 by connecting their device 12 to a charging cord 14, and connecting the other end of the charging cord 14 to one of the ports 38 of the charging hub 22. When charging is complete, or as desired by the user, the user removes the charging cord 14 from the port 38 of the charging hub 22.

The charging hub 22 may include a visual indicator, e.g., a strip of LED lights, showing that the battery 24 is sufficiently charged or is below a certain power level and will need to be recharged soon. For example, a first colored indicator, such as a blue light, may show that the battery 24 has adequate power on reserve, and a second colored indicator, such as a red light, may indicate that the battery 24 is below a certain designated power level, e.g., less than 20% battery charging power remaining. Alternatively, a lower battery power condition may be indicated by blinking lights or other visual indicators. A low power condition also could be indicated audibly, such as by an intermitted beep.

When it is desired to service the electrical components within the battery compartment 18 or recharge the battery 24, the tabletop 20 is moved to the second, flipped up position. As seen by the resultant open position in FIGS. 4-6, the tabletop 20 is extended substantially perpendicular to the opening 60 of the battery compartment 18 so that the user may access the interior of the compartment 18. The movement of the tabletop 20 is permitted by the hinge assembly 44 coupling the lid 40 and the battery compartment 18, and the pivoting or swinging motion permitted between the hinge portions 76, 78. The battery 24 may be removed and replaced with a fully-charged battery.

Figure 9:
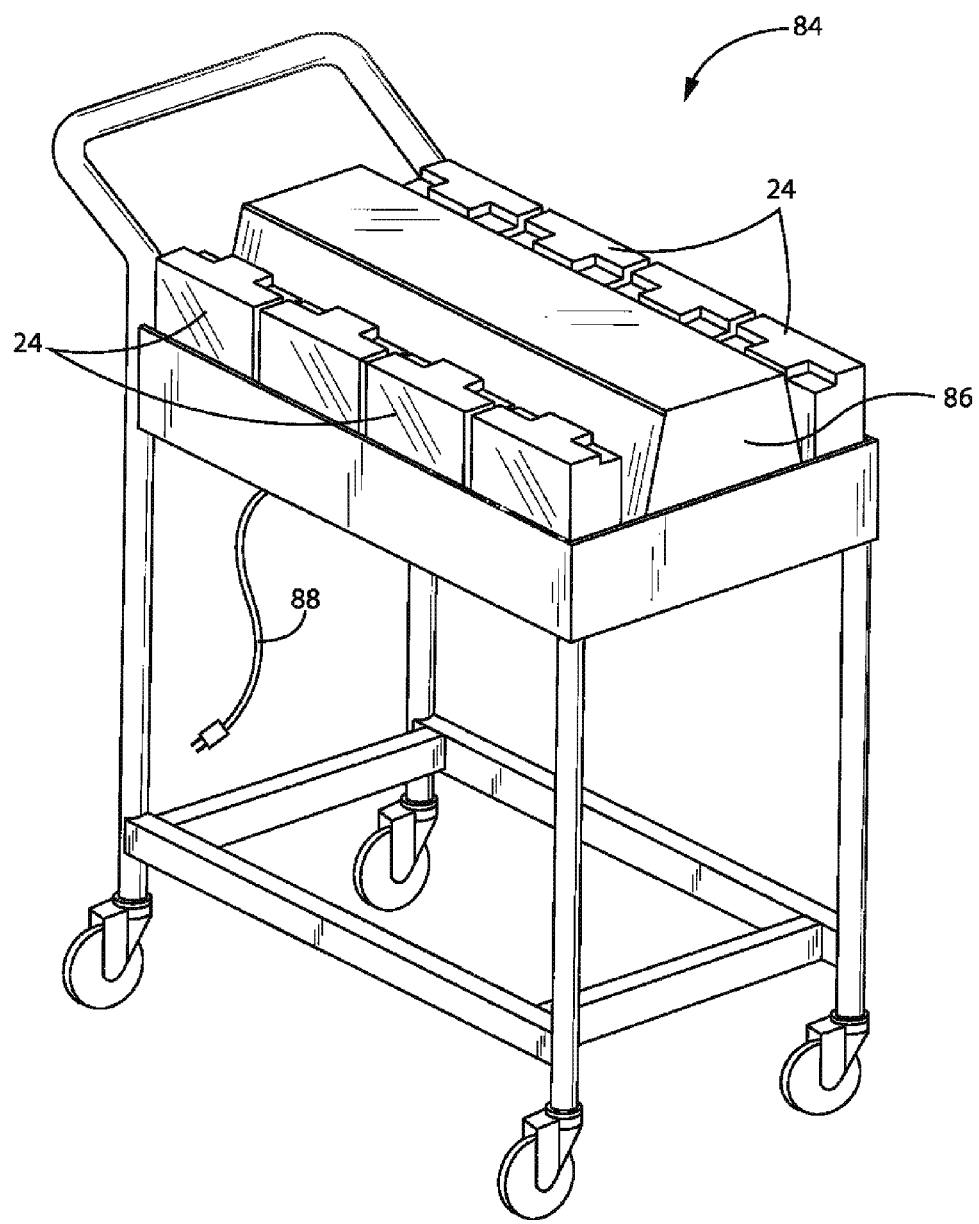
FIG. 9 is an isometric view of a battery charging cart being used in connection with the recharging table whereby the battery charging cart facilitates re-charging of multiple batteries at one time.

As seen in FIG. 9, a battery cart 84 may be used to facilitate charging of batteries 24. The battery cart 84 allows multiple batteries 24 to be charged at one time by coupling the batteries 24 to a corresponding sockets or receptacles of a charging module 86 of the cart. The charging module 86 is coupled to a mains power source, such as AC utility power, by connecting a power cord 88 of the charging module to a standard power outlet. The AC utility power delivers AC power to the charging module to recharge the batteries 24 coupled thereon. An indicator, such as a light indicator, may alert the user when charging is complete and the user may remove the fully charged battery 24 to install into the table assembly 10.

When the user is done servicing the battery 24 and/or electrical components, the tabletop 20 may return to the first, flipped down position for operative use. The user may transport the table assembly 10 to storage when the table assembly 10 is no longer needed. The tabletop 20 may be moved to the flipped up position in storage to take up relatively less storage area.

Figure 10:
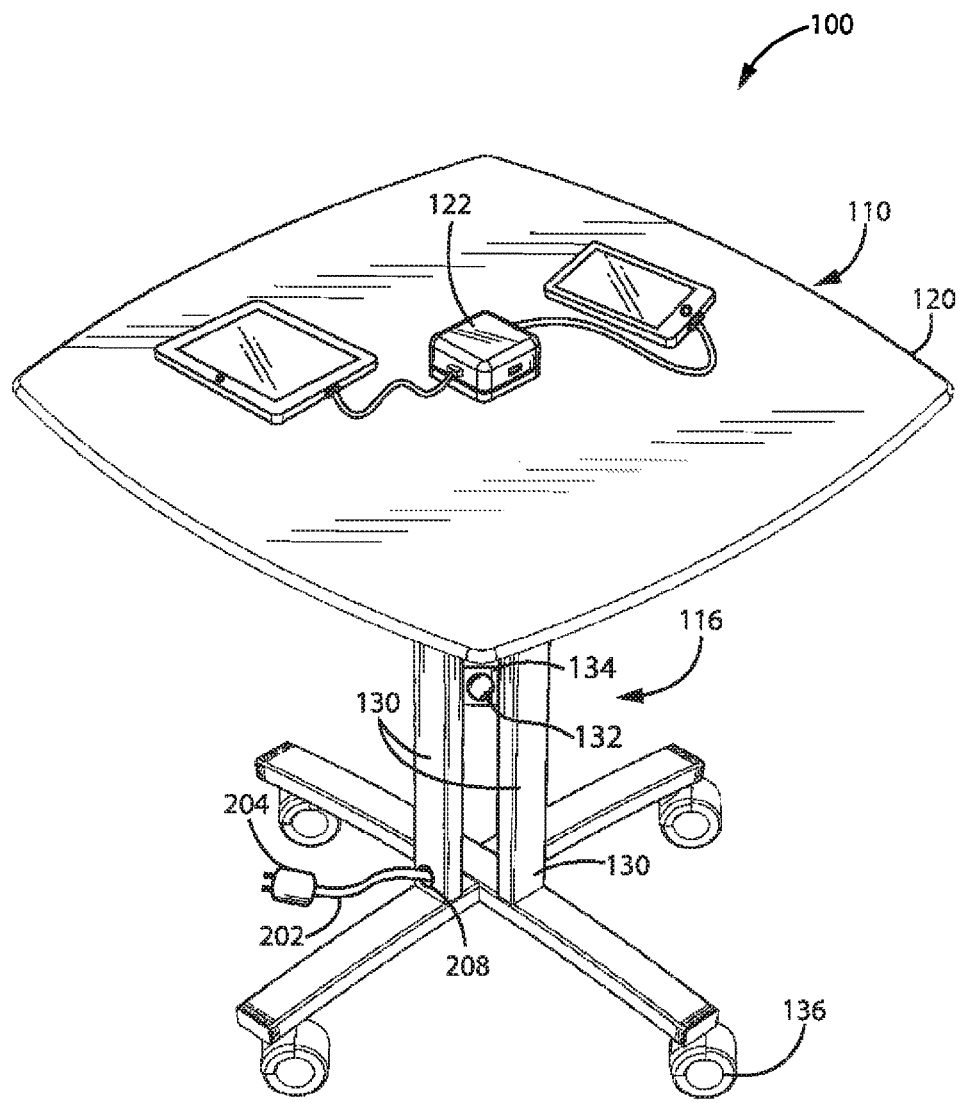
FIG. 10 is an isometric view of a recharging table of a second embodiment of the present invention, having an integrated charger, and showing the tabletop in a deployed or flipped down position.
Figure 11:
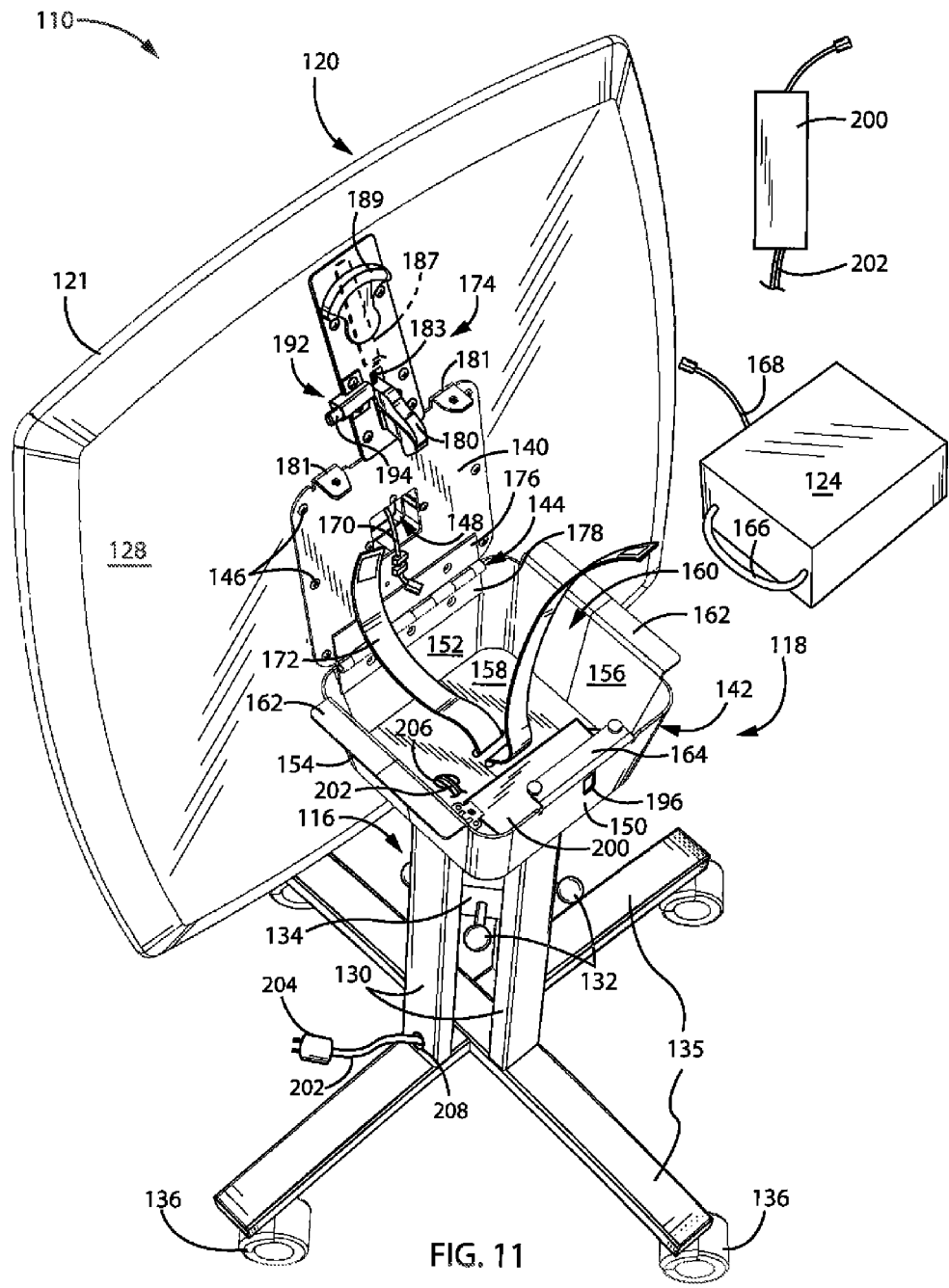
FIG. 11 is an isometric view of the recharging table of FIG. 10, viewed from a location above and generally in front of the table and showing the tabletop in a flipped up or retracted position and exposing a battery compartment with the battery removed.
Figure 12:
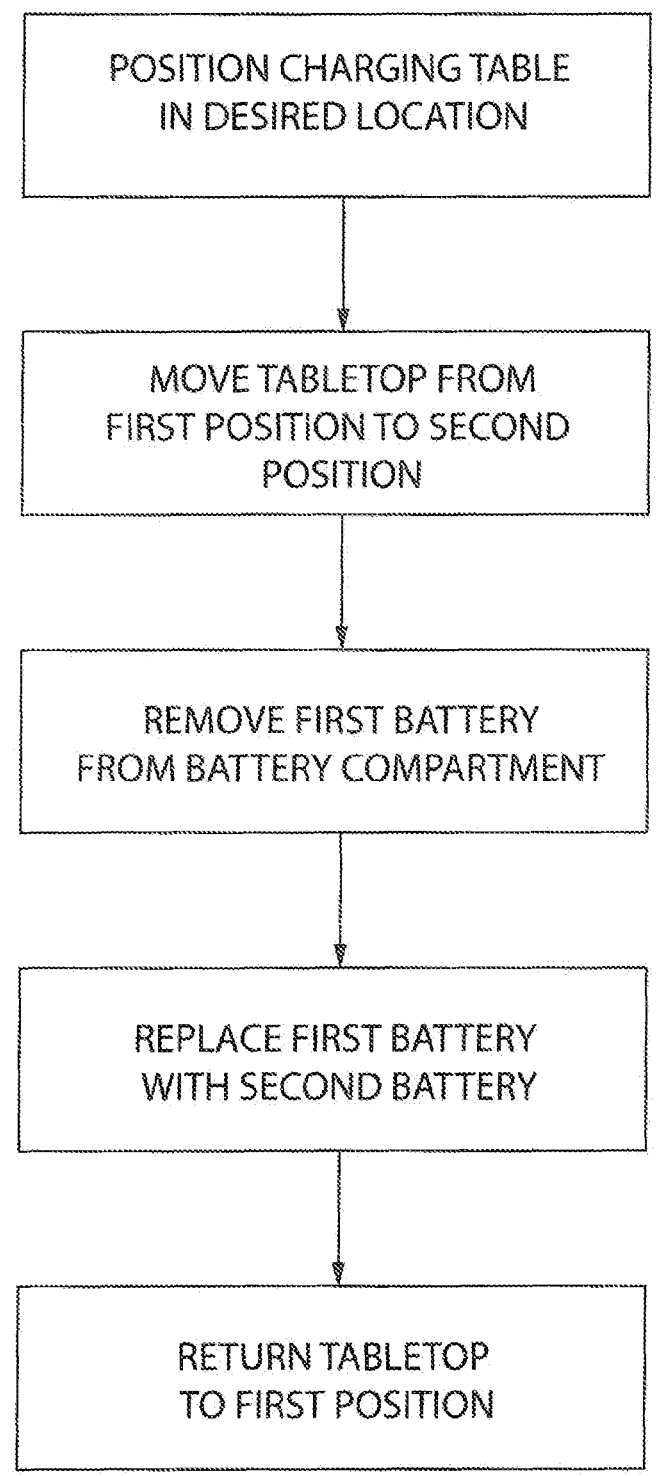
FIG. 12 is a flowchart showing method steps for charging a portable electronic device on the tabletop.

With reference now to FIGS. 10 and 11, a portable charging table 110 is shown in accordance with an alternative embodiment of the invention. Charging table 110 of this embodiment is similar to the charging table 10 of the first embodiments except for the fact that it has an integrated charger. Elements of the charging table 110 of this embodiment that correspond to the charging table 10 of the first embodiment are designated by the same reference numeral, incremented by 100. A description of many of these elements is abbreviated or even eliminated in the interest of brevity. Suffice it to say that the charging table 110 includes a base 116 that supports a battery compartment 118, and a tabletop 120 mounted on the base 116 over the battery compartment 118. The tabletop 120 supports a charging hub 122 that receives electrical power from a battery 124 housed in the battery compartment 118. The base 116 is mounted on wheels 136 providing the desired mobility.

Also as in the first embodiment, the tabletop 120 is attached to a lid 140 of the battery compartment 118 which, in turn, is pivotally mounted to a body 142 of the battery compartment 118 by a hinge assembly 144 as described above in connection with the first embodiment. The tabletop 120 can be held closed by a latch assembly 174 including a latch 180 that selectively engages an opening 196 in the front sidewall 150 of the battery compartment 118. The latch 180 is spring-biased into its closed position and can be retracted from the opening 196 by manual operation of a handle 189, which translates an arm 187 to retract the latch 180. The latch 180 can be locked in its engaged position by a bolt 194 of a lock 192.

As mentioned briefly above, the table 110 of this embodiment has an integrated battery charger 200 that is incorporated into the table 110 so that the battery 124 can be charged without removing it from the table 110 and without having to access the interior of the battery compartment 160. In this case, the table 110 is provided with a power cord 202 having a plug 204 for connecting the integrated battery charger 200 to a source of power. In this case, the tabletop 120 would only need to be moved out of its deployed position for battery service or end-of-life replacement. However, relatively frequent tabletop 120 movement may nevertheless be desired for transport or storage.

As seen in FIG. 11, the battery 124 may be connected to the integrated charger 200 by an electrical connector 168. A power cord 202 extends from the integrated charger 200 to a plug 204 for connection to a power source, such as a standard wall outlet (not shown). The power cord 202 extends through an opening 206 of the bottom wall 158 of the battery compartment 104, through an inner passage (not shown) within one of the vertically extending columns 130, and outward through an opening 208 at a bottom end of the associated vertically extending column 130. It is contemplated that the power cord 202 may extend outward from the table 110 at different locations of the table 110 and travel through different passages of the table 110 than the arrangement shown in FIGS. 10 and 11 to either expose or conceal a partial length of the power cord 202 from view.

It should be noted that, since the battery 124 of this embodiment need not be removed frequently, the tabletop 120 could be secured in its flipped-down position in a semi-permanent manner. As such, the latch assembly 174 could be replaced by or supplemented with a fastener arrangement connecting the battery compartment lid 140 to the body 142. The fasteners could, for example, comprise screws (not shown) passing through tangs 181 extending downwardly from the front end of the lid 140.

Many other changes and modifications could be made to the invention without departing from the spirit thereof.

For example, the tabletop 20, 106 need not be pivotally supported on the base 16, 102 so long as it is selectively movable relative to the base 16, 102 so as to expose an access opening 60, 144 for the battery compartment 18, 104.

The scope of these changes and modifications will become apparent from the appended claims.

What we claim is:

1. A charging table comprising:
   a base that is supported on a floor;
   a vertically extending column supported on the base and having a top;
   a battery compartment that is supported on the vertically extending column, wherein the battery compartment is defined by an enclosure having an upwardly-facing access opening;
   a tabletop supported on the battery compartment and having a first surface and a second surface;
   a battery powered charging hub supported on the first surface of the tabletop, the charging hub having at least one port for connection to a portable electronic device;
   a hinge connected to the enclosure of the battery compartment and coupling the tabletop to the battery compartment so as to permit the tabletop to move between a first position and a second position;
   wherein the battery compartment is positioned vertically between the top of the vertically extending column and the tabletop,
   wherein the tabletop is movably coupled to the battery compartment via the hinge so as to be selectively movable via operation of the hinge 1) from the first position in which the first surface extends at least substantially horizontally and the second surface overlies the access opening of the battery compartment so that the tabletop blocks the access opening, 2) to the second position in which the first surface is inclined relative to the horizontal and in which the access opening is exposed to permit battery insertion into and removal from the access opening of the battery compartment from above, wherein
   when the tabletop is in the first position thereof, the second surface of the tabletop is spaced from the floor by a distance that is sufficient to accommodate seated use so that a seat of a chair may fit thereunder without interference from the tabletop, and wherein
   the tabletop has a diameter that is substantially greater than diameters of the battery compartment and the vertically extending column such that the seat of the chair may fit under the tabletop without interference from the battery compartment or the vertically extending column.

2. The charging table of claim 1, wherein the first surface swings through a vertical plane when the tabletop moves about the hinge from the first position thereof to the second position thereof.

3. The charging table of claim 1, wherein the battery compartment has a body that is mounted on top of the vertically extending column and a lid that is pivotally connected to body by the hinge so as to selectively overlay the opening, the lid being attached to the second surface of the tabletop.

4. The charging table of claim 3, wherein the lid has a latch that is selectively engageable with the body of battery compartment to latch the tabletop in the first position.

5. The charging table of claim 1, further comprising a fastener assembly that semi-permanently attaches the lid to the body of the battery compartment to secure the tabletop in the first position.

6. The charging table of claim 1, wherein the tabletop has an opening for allowing a cord to extend through the tabletop to the battery compartment from the charging hub, and further comprising an electrical connector in the battery compartment for connecting a battery to the charging hub.

7. The charging table of claim 1, wherein the charging hub has at least one USB port.

8. The charging table of claim 1, wherein the base is supported on the floor by a plurality of wheels.

9. A charging table system comprising:
   a mobile base supported on a floor by wheels;

a vertically extending column supported on the mobile base and having a top;

a tabletop having a first surface and a second surface;

a battery compartment mounted on top of the vertically extending column and positioned vertically between the top of the vertically extending column and the tabletop, the battery compartment having 1) a body defining an interior and an upwardly facing access opening for removably receiving at least one battery, and 2) a lid pivotally connected to the body via a hinge connected to the body the battery compartment so as to pivot about a horizontal axis, the hinge being located under the tabletop and being located inwardly of an outer edge of the tabletop, the lid being attached to the second surface of the tabletop so as to allow the tabletop and the lid to move a) from a first position in which an upper surface of the tabletop extends at least substantially horizontally and the lid overlies the access opening to block the access opening from above b) to a second position in which the tabletop extends at an angle substantially perpendicular to the access opening and the lid is inclined relative to the opening to permit access to the access opening from above, wherein the tabletop has a diameter that is substantially greater than diameters of the battery compartment and the vertically extending column;

a battery powered charging hub disposed on and extending above the first surface and having at least one port for connection to a portable electronic device; and an electrical connection extending from the charging hub, through the tabletop, and into the battery compartment;

wherein, when the tabletop and the lid are in the first position thereof, a portion of the tabletop overhangs the moveable base and battery compartment such that the second surface of the tabletop is spaced from the floor, wherein the vertically extending column and the battery compartment collectively have a height sufficient to position the tabletop sufficiently above a floor to accommodate a seat of a chair under the tabletop without interference from the tabletop, and wherein the tabletop has a diameter greater than diameters of the battery compartment and the vertically extending column by an amount such that the overhanging portion of the tabletop is spaced horizontally from the vertically extending column and the battery compartment sufficiently to permit the seat of the chair to fit under the overhanging portion without interference from the vertically extending column or the battery compartment.

10. The system of claim 9, wherein the charging hub has at least one USB port.

11. The system of claim 9, wherein the first surface swings through a vertical plane when the tabletop moves about the hinge from the first position thereof to the second position thereof.

12. The system of claim 9, further comprising a latch for selectively latching the lid of the battery compartment to the body of the battery compartment.

13. The system of claim 12, further comprising a mobile charging cart that has receptacles for a plurality of batteries and that has connections for supplying electrical power to the batteries from a mains source to charge the batteries.

14. The system of claim 9, further comprising a battery that is removably insertable into the battery compartment via the upper access opening and that can be removably connected to the electrical connection.

15. The charging table system of claim 9, further comprising a fastener assembly that semi-permanently attaches the lid to the body of the enclosure to secure the tabletop in the first position.

16. A method of charging a portable electronic device on a table assembly comprising the steps of:
positioning a charging table in a desired location on a horizontal surface, wherein the charging table comprises
a movable base supported on a floor,
a vertically extending column supported on the mobile base and having a top,
a tabletop having first and second surfaces,
a battery powered charging hub supported on the first surface of the tabletop, the charging hub having at least one port for connection to a portable electronic device,
a battery compartment that is supported on the vertically extending column, that is positioned vertically between the top of the vertically extending column and the tabletop, and that is defined by an enclosure having an upwardly facing access opening,
a hinge connected to the enclosure of the battery compartment and coupling the tabletop to the battery compartment;
moving the tabletop about the hinge a) from a first position in which the first surface extends at least substantially horizontally and the second surface overlies the access opening such that the tabletop blocks access to the access opening from above, b) to a second position in which the first surface extends at an angle relative to the horizontal surface and in which the access opening is exposed;
removing a first battery from the battery compartment via the access opening and replacing the first battery with a second battery; and
returning the tabletop to the first position;
wherein, when the tabletop is in the first position thereof, the tabletop overhangs the vertically extending column and the battery compartment such that an overhanging portion of the second surface of the tabletop is spaced from the floor, wherein
the vertically extending column and the battery compartment collectively have a height sufficient to accommodate seated use so that a seat of a chair may fit under the tabletop without interference from the tabletop, and wherein
the tabletop has a diameter greater than diameters of the battery compartment and the vertically extending column by amount such that the overhanging portion of the tabletop is spaced horizontally from the vertically extending column and the battery compartment sufficiently to permit the seat of the chair to fit under the overhanging portion without interference from the vertically extending column or the battery compartment.

17. The method as recited in claim 16, wherein the moving step comprises pivoting the tabletop about a horizontal axis via operation of the hinge.

18. The method as recited in claim 16, wherein the tabletop is mounted to a lid of the battery compartment that is pivotally connected to a body of the battery compartment via the hinge.

19. The method as recited in claim 18, further comprising unlatching the lid from the body prior to the moving step.

20. The method as recited in claim 19, further comprising supporting the first battery and additional batteries on a mobile charging cart with other batteries and charging the batteries while they are supported on the mobile charging cart using electrical power to the batteries from a mains source.

* * * * *